US012581472B2

(12) United States Patent
Liu

(10) Patent No.: US 12,581,472 B2
(45) Date of Patent: Mar. 17, 2026

(54) ACTIVATION INDICATION METHOD AND APPARATUS, FREQUENCY BAND ACTIVATION METHOD AND APPARATUS, COMMUNICATION APPARATUS, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 18/575,299

(22) PCT Filed: Jun. 30, 2021

(86) PCT No.: PCT/CN2021/103684
§ 371 (c)(1),
(2) Date: Dec. 28, 2023

(87) PCT Pub. No.: WO2023/272605
PCT Pub. Date: Jan. 5, 2023

(65) Prior Publication Data
US 2024/0314754 A1      Sep. 19, 2024

(51) Int. Cl.
*H04W 72/04*        (2023.01)
*H04B 7/06*         (2006.01)
(Continued)

(52) U.S. Cl.
CPC .... *H04W 72/0453* (2013.01); *H04B 7/06968* (2023.05); *H04W 56/0045* (2013.01); *H04W 72/0457* (2023.01); *H04W 72/231* (2023.01)

(58) Field of Classification Search
None
See application file for complete search history.

(56) References Cited

U.S. PATENT DOCUMENTS 11,678,333 B2 *  6/2023  Lei ................... H04W 72/0453
                                              370/329
2019/0141734 A1 *  5/2019  Lei ........................ H04W 72/23
(Continued)

FOREIGN PATENT DOCUMENTS

CN        106559874 A      4/2017
CN        109906651 A      6/2019
(Continued)

OTHER PUBLICATIONS

International Search Report of PCT/CN2021/103684 dated Mar. 29, 2029 with English translation, (4p).
(Continued)

*Primary Examiner* — Shukri Taha
(74) *Attorney, Agent, or Firm* — Arch & Lake LLP; Hao Tan; Shen Wang

(57)            ABSTRACT

The present disclosure relates to an activation indication method, including: sending activation indication information to a terminal. The terminal is configured with at least one bandwidth part BWP operating in an aggregated frequency band, the aggregated frequency band includes a new frequency-band identifier and a plurality of sub-frequency bands, at least two adjacent sub-frequency bands among the plurality of sub-frequency bands are discontinuous, and a bandwidth corresponding to the BWP comprises at least one sub-frequency band in the aggregated frequency band. The activation indication information is used for activating one BWP among the at least one configured BWP and at least one sub-frequency band among the sub-frequency bands corresponding to the activated BWP.

20 Claims, 4 Drawing Sheets

(51) Int. Cl.
<div>

| | | |
|---|---|---|
| *H04W 56/00* | (2009.01) | |
| *H04W 72/0453* | (2023.01) | |
| *H04W 72/0457* | (2023.01) | |
| *H04W 72/231* | (2023.01) | |

</div>

(56) References Cited

U.S. PATENT DOCUMENTS

| | | | |
|---|---|---|---|
| 2020/0314889 A1 | 10/2020 | Cirik et al. | |
| 2021/0298056 A1 | 9/2021 | Fu et al. | |
| 2022/0022250 A1 * | 1/2022 | Cirik | .................. H04W 74/085 |
| 2023/0049868 A1 * | 2/2023 | Zhou | ..................... H04L 5/0098 |
| 2023/0189232 A1 * | 6/2023 | Rastegardoost | ...... H04L 5/0012 |
| | | | 370/329 |

FOREIGN PATENT DOCUMENTS

| | | |
|---|---|---|
| CN | 110771250 A | 2/2020 |
| CN | 110831022 A | 2/2020 |
| CN | 110831163 A | 2/2020 |
| CN | 111106907 A | 5/2020 |
| CN | 111295859 A | 6/2020 |
| CN | 111356236 A | 6/2020 |
| CN | 112997556 A | 6/2021 |
| WO | 2019019893 A1 | 1/2019 |
| WO | 2019091233 A1 | 5/2019 |
| WO | 2021093963 A1 | 5/2021 |
| WO | WO-2025235962 A1 * | 11/2025 ........... H04L 5/0092 |

OTHER PUBLICATIONS

Intel Corporation, "On BWP reconfiguration", 3GPP TSG-RAN WG4 Meeting #85, R4-1712875 Reno, USA, Nov. 27-Dec. 1, 2017,(5p).

Nokia, Nokia Shanghai Bell, "Interruption requirements with BWP switch on multiple CCs", 3GPP TSG-RAN WG4 Meeting #92bis, R4-1911790 Chongqing, China, Oct. 14-18, 2019, (8p).

MediaTek Inc., "Summary of Bandwidth Part Remaining Issues", 3GPP TSG RAN WG1 Meeting #94bis, R1-1811893 Chengdu, China, Oct. 8-Oct. 12, 2018, (26p).

Apple Inc., "Non-simultaneous transmission for inter-band UL CA in FR2", 3GPP RAN WG4 Meeting #92, R4-1908014 Ljubljana, Slovenia, Aug. 26-30, 2019, (4p).

Huawei, HiSilicon, "Remaining issues for CSI framework", 3GPP TSG RAN WG1 Meeting #91, R1-1719426 Reno, USA, Nov. 27-Dec. 1, 2017, (8p).

The State Intellectual Property Office of People's Republic of China, "Notification to Grant Patent Right for Invention" issued in Application No. 202180002009.4 dated Jun. 14, 2024, with English translation, (7p).

The First CNOA issued in Application No. 202180002009.4 dated Feb. 27, 2024 (13p).

* cited by examiner sending activation indication information to a terminal, where the terminal is configured with at least one bandwidth part BWP operating in an aggregated frequency band, the aggregated frequency band has a new frequency-band identifier and includes a plurality of sub-frequency bands, at least two adjacent sub-frequency bands are discontinuous, a bandwidth corresponding to the BWP includes at least one sub-frequency band in the aggregated frequency band, and the activation indication information is used for activating one BWP in the at least one configured BWP and at least one sub-frequency band in the sub-frequency bands corresponding to the activated BWP.

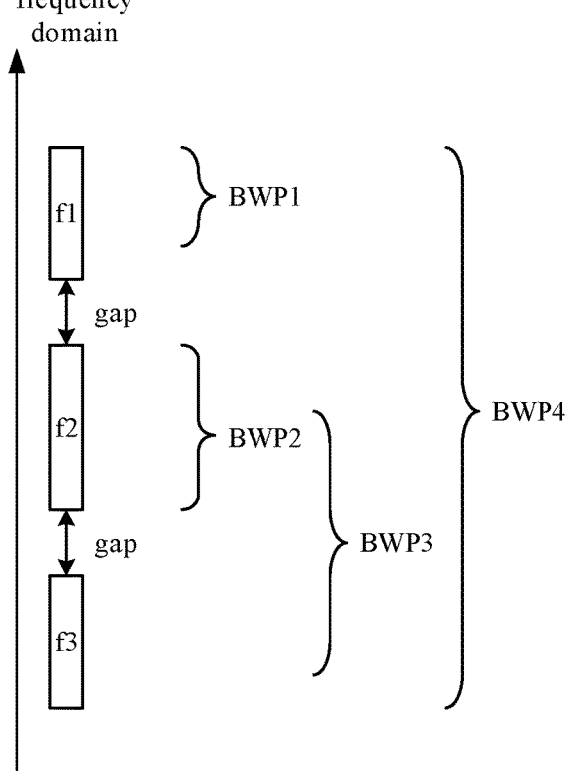

Fig. 2

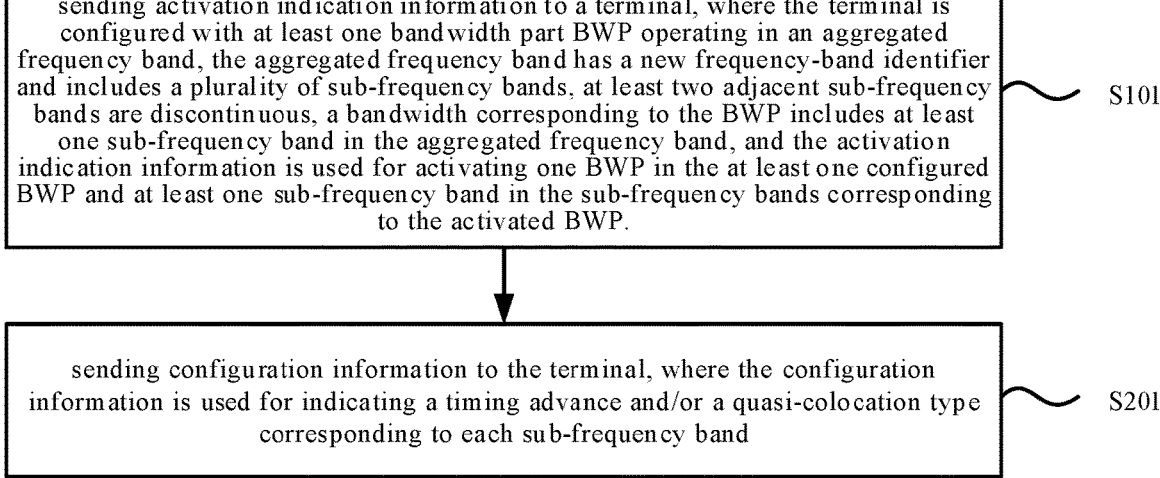

sending activation indication information to a terminal, where the terminal is configured with at least one bandwidth part BWP operating in an aggregated frequency band, the aggregated frequency band has a new frequency-band identifier and includes a plurality of sub-frequency bands, at least two adjacent sub-frequency bands are discontinuous, a bandwidth corresponding to the BWP includes at least one sub-frequency band in the aggregated frequency band, and the activation indication information is used for activating one BWP in the at least one configured BWP and at least one sub-frequency band in the sub-frequency bands corresponding to the activated BWP.     S101 sending configuration information to the terminal, where the configuration information is used for indicating a timing advance and/or a quasi-colocation type corresponding to each sub-frequency band     S201

Fig. 3

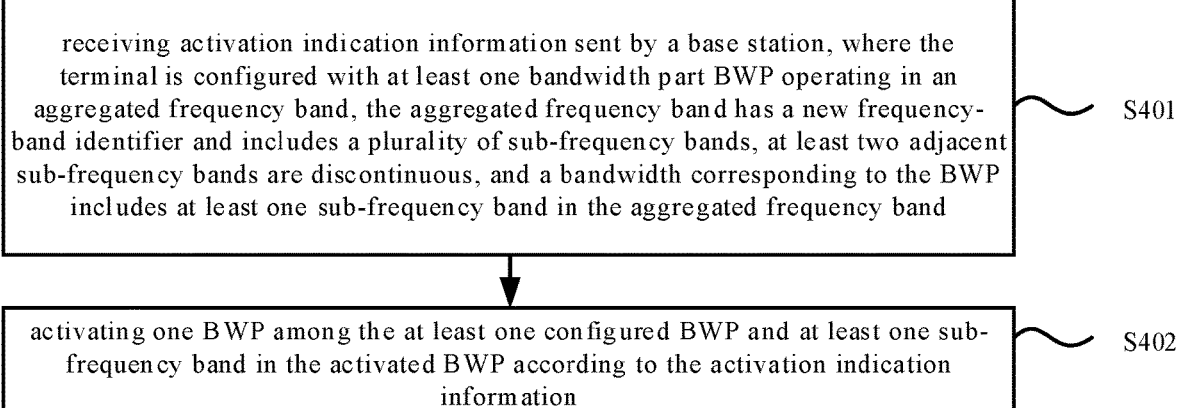

receiving activation indication information sent by a base station, where the terminal is configured with at least one bandwidth part BWP operating in an aggregated frequency band, the aggregated frequency band has a new frequency-band identifier and includes a plurality of sub-frequency bands, at least two adjacent sub-frequency bands are discontinuous, and a bandwidth corresponding to the BWP includes at least one sub-frequency band in the aggregated frequency band     S401 activating one BWP among the at least one configured BWP and at least one sub-frequency band in the activated BWP according to the activation indication information     S402

Fig. 4

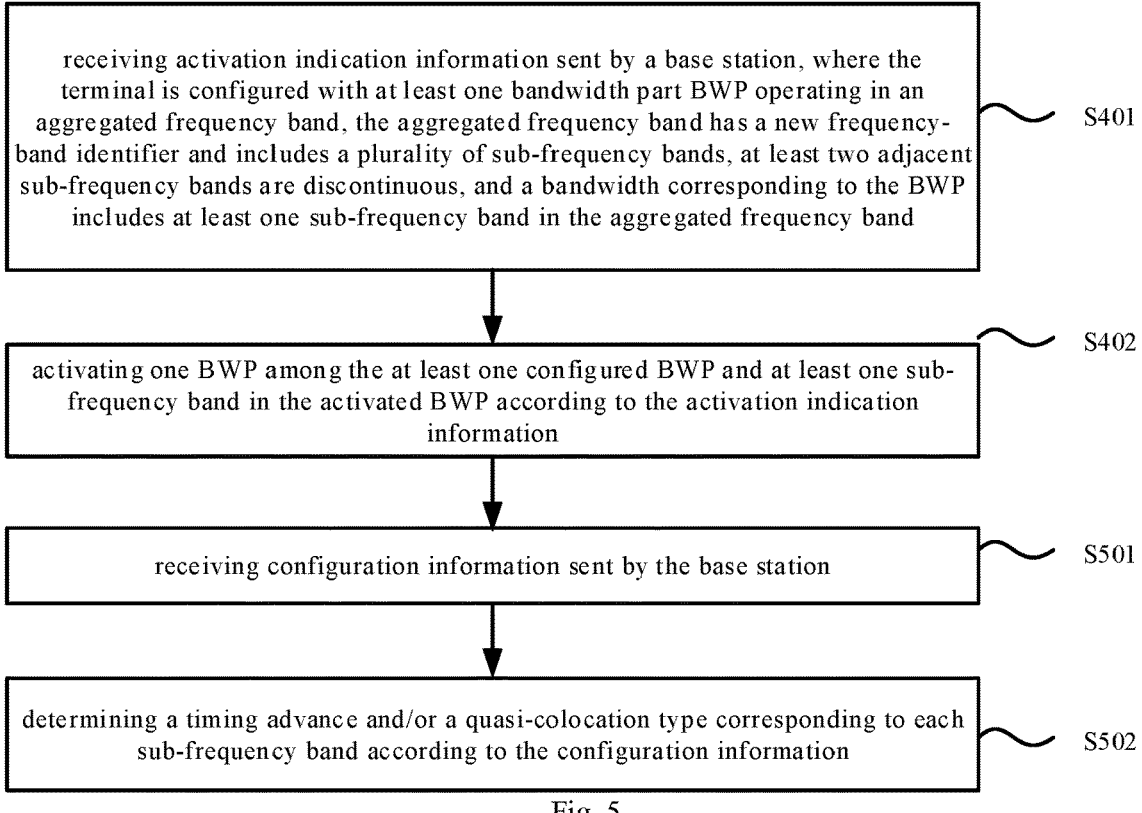

receiving activation indication information sent by a base station, where the terminal is configured with at least one bandwidth part BWP operating in an aggregated frequency band, the aggregated frequency band has a new frequency-band identifier and includes a plurality of sub-frequency bands, at least two adjacent sub-frequency bands are discontinuous, and a bandwidth corresponding to the BWP includes at least one sub-frequency band in the aggregated frequency band

S401 activating one BWP among the at least one configured BWP and at least one sub-frequency band in the activated BWP according to the activation indication information

S402 receiving configuration information sent by the base station

S501 determining a timing advance and/or a quasi-colocation type corresponding to each sub-frequency band according to the configuration information

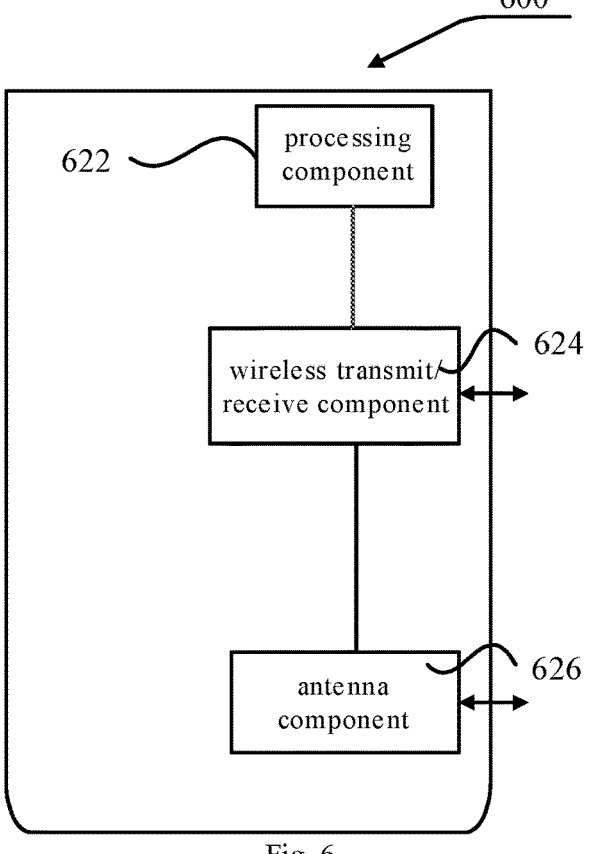

600

622    processing component wireless transmit/receive component    624 antenna component    626

Fig. 6

ACTIVATION INDICATION METHOD AND APPARATUS, FREQUENCY BAND ACTIVATION METHOD AND APPARATUS, COMMUNICATION APPARATUS, AND STORAGE MEDIUM

CROSS REFERENCE TO RELATED APPLICATION(S)

The present application is a U.S. national phase application of International Application No. PCT/CN2021/103684 filed on Jun. 30, 2021, the content of which is incorporated herein by reference in its entirety for all purposes.

TECHNICAL FIELD

The present disclosure relates to the field of communication technology, and specifically, to an activation indication method, a frequency band activation method, an activation indication apparatus, a frequency band activation apparatus, a communication apparatus, and a non-transitory computer-readable storage medium.

BACKGROUND

With the development of communication technology, base stations and terminals may communicate in more and more frequency bands. For example, in 5G, the communication frequency bands have been expanded to the FR1 and FR2 frequency bands.

However, there are currently some restrictions on the frequency bands used for communication and indicated by base stations to terminals. For example, in general, the frequency band used by a base station to communicate with a terminal is a continuous frequency band, or a plurality of continuous frequency bands. That is, the communication is made through a plurality of frequency bands, but the plurality of frequency bands is connected. This may result in limited communication for certain frequency bands.

SUMMARY

In view of above, embodiments of the present disclosure propose an activation indication method, a frequency band activation method, an activation indication apparatus, a frequency band activation apparatus, a communication apparatus, and a non-transitory computer-readable storage medium to solve technical problems in related technologies.

According to a first aspect of embodiments of the present disclosure, an activation indication method is proposed, which is performed by a base station. The method includes: sending activation indication information to a terminal. The terminal is configured with at least one bandwidth part BWP operating in an aggregated frequency band. The aggregated frequency band has a new frequency-band identifier and includes a plurality of sub-frequency bands. At least two adjacent sub-frequency bands among the plurality of sub-frequency bands are discontinuous. The bandwidth corresponding to the BWP includes at least one sub-frequency band in the aggregated frequency band. The activation indication information is used for activating one BWP among the at least one configured BWP and at least one sub-frequency band among the sub-frequency bands corresponding to the activated BWP.

According to the second aspect of embodiments of the present disclosure, a frequency band activation method is proposed, which is performed by a terminal. The method includes: receiving activation indication information sent by a base station. The terminal is configured with at least one bandwidth part BWP operating in the aggregated frequency band. The aggregated frequency band has a new frequency-band identifier and includes a plurality of sub-frequency bands. At least two adjacent sub-frequency bands among the plurality of sub-frequency bands are discontinuous. The bandwidth corresponding to the BWP includes at least one sub-frequency band in the aggregated frequency band. The method further includes: activating one BWP in the at least one configured BWP and at least one sub-frequency band in the activated BWP according to the activation indication information.

According to a third aspect of embodiments of the present disclosure, an activation indication apparatus is proposed. The apparatus includes one or more processors. The processor is configured to send activation indication information to a terminal. The terminal is configured at least one bandwidth part BWP operating in an aggregated frequency band. The aggregated frequency band has a new frequency-band identifier and includes a plurality of sub-frequency bands. At least two adjacent sub-frequency bands among the plurality of sub-frequency bands are discontinuous. The bandwidth corresponding to the BWP includes at least one sub-frequency band in the aggregated frequency band. The activation indication information is used for activating one BWP among the at least one configured BWP and at least one sub-frequency band among the sub-frequency bands corresponding to the activated BWP.

According to the fourth aspect of embodiments of the present disclosure, a frequency band activation apparatus is proposed. The apparatus includes one or more processors. The processor is configured to receive activation indication information sent by a base station. The terminal is configured with at least one bandwidth part BWP operating in an aggregated frequency band. The aggregated frequency band has a new frequency-band identifier and includes a plurality of sub-frequency bands. At least two adjacent sub-frequency bands among the plurality of sub-frequency bands are discontinuous. The bandwidth corresponding to the BWP includes at least one sub-frequency band in the aggregated frequency band. The processor is further configured to activate one BWP among the at least one configured BWP and at least one sub-frequency band in the activated BWP according to the activation indication information.

According to a fifth aspect of embodiments of the present disclosure, a communication apparatus is proposed, including: a processor; and a memory for storing instructions executable by the processor. The processor is configured to perform the above activation indication method.

According to a fifth aspect of embodiments of the present disclosure, a communication apparatus is proposed, including: a processor; and a memory for storing instructions executable by the processor. The processor is configured to perform the above frequency band activation method.

According to a sixth aspect of embodiments of the present disclosure, a non-transitory computer-readable storage medium is proposed for storing a computer program. The computer program is configured to implement the steps in the above activation indication method when executed by a processor.

According to a sixth aspect of embodiments of the present disclosure, a non-transitory computer-readable storage medium is proposed for storing a computer program. The computer program is configured to implement the steps in the above frequency band activation method when executed by a processor.

BRIEF DESCRIPTION OF THE DRAWINGS

In order to explain the technical solutions in the embodiments of the present disclosure more clearly, the drawings to be used in the description of the embodiments will be briefly introduced below. It is noted that the drawings in the following description are only some embodiments of the present disclosure. For those of ordinary skill in the art, other drawings can also be obtained based on these drawings without exerting creative efforts.

FIG. 1 is a schematic flow chart of an activation indication method according to some embodiments some embodiments of the present disclosure.

FIG. 2 is a schematic flow chart of an activation indication method according to another embodiment of the present disclosure.

FIG. 3 is a schematic flow chart of an activation indication method according to yet another embodiment of the present disclosure.

FIG. 4 is a schematic flow chart of a frequency band activation method according to some embodiments of the present disclosure.

FIG. 5 is a schematic flow chart of a frequency band activation method according to another embodiment of the present disclosure.

FIG. 6 is a schematic block diagram of an activation indication apparatus according to some embodiments of the present disclosure.

DETAILED DESCRIPTION OF THE EMBODIMENTS

Figure 7:
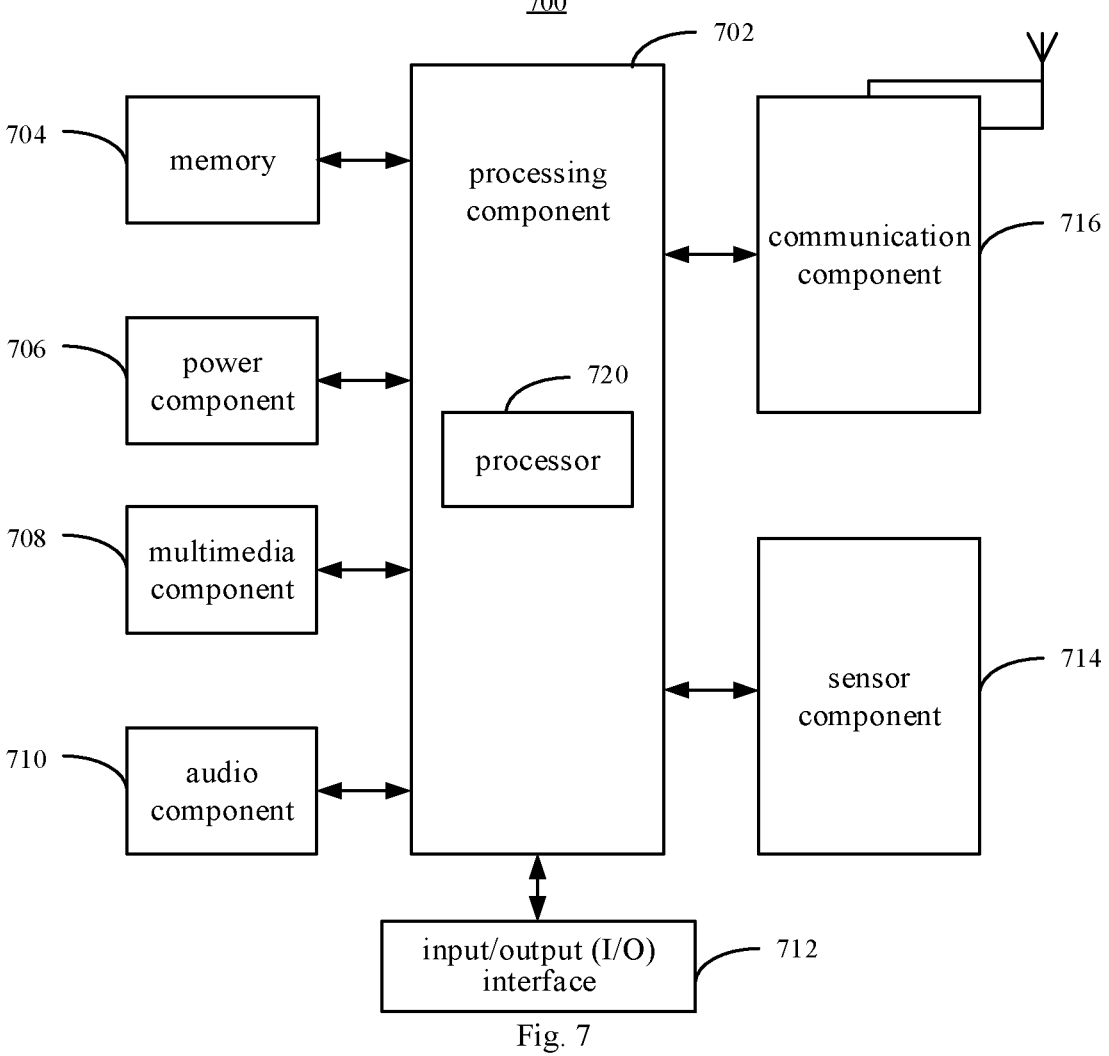
FIG. 7 is a schematic block diagram of a frequency band activation apparatus according to some embodiments of the present disclosure.

The technical solutions in the embodiments of the present disclosure will be clearly and completely described below with reference to the accompanying drawings in the embodiments of the present disclosure. It is noted that the described embodiments are only part of the embodiments of the present disclosure, not all of them. Based on the embodiments in the present disclosure, all other embodiments obtained by those of ordinary skill in the art without creative efforts fall within the scope of protection of the present disclosure.

The terms used in the embodiments of the present disclosure are only for the purpose of describing specific embodiments, and are not intended to limit the embodiments of the present disclosure. As used in the embodiments of the present disclosure and the appended claims, the singular forms "a", "an", and "the" are intended to include the plural forms as well, unless the context clearly dictates otherwise. It will also be understood that the term "and/or" as used herein refers to and includes any and all possible combinations of one or more of the associated items as listed.

It should be understood that although the terms first, second, third, etc. may be used to describe various information in the embodiments of the present disclosure, the information should not be limited only to these terms. These terms are only used to distinguish information of the same type from each other. For example, without departing from the scope of the embodiments of the present disclosure, the first information may also be called the second information, and similarly, the second information may also be called the first information. Depending on the context, the word "if" as used herein may be interpreted as "when" or "while" or "in response to."

For the purpose of simplicity and ease of understanding, the terms used in the description are "greater than" or "less than" or "higher than" or "lower than" when characterizing the size relationship. But, for those skilled in the art, it can be understood that the term "greater than" also covers the meaning of "greater than or equal to", and the term "less than" also covers the meaning of "less than or equal to"; and the term "higher than" also covers the meaning of "higher than or equal to", and the term "less than" also covers the meaning of "less than or equal to".

FIG. 1 is a schematic flow chart of an activation indication method according to some embodiments of the present disclosure. The activation indication method shown in this embodiment may be performed by a base station, which includes, but is not limited to, base stations in communication systems, such as 4G base station, 5G base station, and 6G base station. The base station may communicate with a terminal that is user equipment, including, but not limited to, mobile phone, tablet computer, wearable device, sensor, Internet of Things device, and other communication device.

As shown in FIG. 1, the activation indication method may include the following step(s).

In step S101, activation indication information is sent to the terminal. The terminal is configured with at least one bandwidth part BWP operating in an aggregated frequency band. The aggregated frequency band has a new frequency-band identifier and includes a plurality of sub-frequency bands. At least two adjacent sub-frequency bands among the plurality of sub-frequency bands are discontinuous. The bandwidth corresponding to the BWP includes at least one sub-frequency band in the aggregated frequency band.

The activation indication information is used for activating one BWP among the at least one configured BWP and at least one sub-frequency band among the sub-frequency bands corresponding to the activated BWP.

According to embodiments of the present disclosure, the bandwidth corresponding to the BWP includes at least one sub-frequency band in the aggregated frequency band, and at least one sub-frequency band corresponding to the activated BWP may not all in operation. In this case, not only the BWP can be activated through the activation indication information, but also at least one sub-frequency band among the BWP sub-frequency bands can be activated. Accordingly, the accuracy in activating frequency domain resources can be improved, which is beneficial to meet the communication requirements between the base station and the terminal.

In addition, since different sub-frequency bands belong to the same BWP and different sub-frequency bands have the same SCS, the BWP can be kept active when switching between frequency bands. The terminal can change the activated sub-frequency band simply based on the indication of different sub-frequency bands, and there is no need to deactivate BWPs or deactivate sub-frequency bands. For example, the currently activated sub-frequency band is f1. If the activation indication information indicates to activate f2, the terminal can directly switch from f1 to f2, without deactivating the BWP where f1 and f2 are located, or deactivating f1. This is beneficial to reduce the delay in switching between frequency bands and reduce resource consumption during the switching process.

In some embodiments, there may be some individual frequency bands on the communication frequency band. These frequency bands are not continuous, and the bandwidth of each frequency band is small. For example, there are some individual frequency bands around 1 GHz that are re-farmed for the 5G system, and the bandwidths of these frequency bands are around 30M. It is difficult for using these frequency bands individually to meet the requirements in certain 5G communication service scenarios. For example, in the case of Enhanced Mobile Broadband (eMBB) services, the required bandwidth must reach 100M.

In some embodiments, the base station may determine a plurality of sub-frequency bands, and at least two adjacent sub-frequency bands among the plurality of sub-frequency bands are discontinuous. For example, two adjacent sub-frequency bands among the plurality of sub-frequency bands are discontinuous. As an example, each of the plurality of sub-frequency bands is discontinuous. As another example, some sub-frequency bands are continuous, and some sub-frequency bands are discontinuous. Furthermore, the base station may indicate the plurality of sub-frequency bands as an aggregated frequency band to the terminal, so that the bandwidth of the plurality of sub-frequency bands as an aggregated frequency band can meet the requirements for most services, thereby rendering the sub-frequency bands to be effectively utilized when they have smaller bandwidths and are discontinuous with other sub-frequency bands. In all embodiments of the present disclosure, the expression fo two adjacent sub-frequency bands being discontinuous means that there is a gap between the two adjacent sub-frequency bands. That is, the two adjacent sub-frequency bands are discontinuous in frequency.

In some embodiments, the base station may send configuration information to the terminal, for configuring at least one BWP operating in the aggregated frequency band and the bandwidth corresponding to each BWP for the terminal. The terminal may determine at least one BWP in the aggregated frequency band according to the configuration information, and determine the bandwidth corresponding to each BWP. In another embodiment, the UE may determine the BWP, that is, the bandwidth corresponding to the BWP, according to the relevant communication standards. The base station may determine the BWP, that is, the bandwidth corresponding to the BWP, according to the relevant communication standards. For example, a preset determination method (such as a calculation formula) is provided in the protocol for determining the bandwidth corresponding to BWP. In another embodiment, the UE may negotiate with the base station to determine the bandwidth corresponding to the BWP. That is, the bandwidth corresponding to each BWP may be configured based on the base station, may be determined based on the protocol, or may be determined through negotiations between the base station and the UE. In the above embodiment, with respect to the at least one configured BWP, the activation indication information may also be sent to the terminal to activate one of the BWPs.

According to embodiments of the present disclosure, the bandwidth corresponding to the BWP includes at least one sub-frequency band in the aggregated frequency band, and at least one sub-frequency band corresponding to the activated BWP may not all in operation. In this case, not only the BWP can be be activated through the activation indication information, but also at least one sub-frequency band in the BWP sub-frequency bands can be activated. Accordingly, the accuracy in activating frequency domain resources can be improved, which is beneficial to meet the communication requirements between the base station and the terminal.

For example, the terminal is configured with four BWPs operating in the aggregated frequency band, namely BWP1, BWP2, BWP3, and BWP4. The aggregated frequency band includes three discontinuous sub-frequency bands f1, f2, and f3. The BWP that needs to be activated is BWP4. BWP4 corresponds to sub-frequency bands f1, f2, and f3. With the activation indication information, BWP4 can be activated, and one or more sub-frequency bands in BWP4 can also be activated. For example, f1 corresponding to BWP4 is activated, so that the terminal can communicate with the base station on the activated sub-frequency band in the activated BWP, for example, communicate with the base station on f1 corresponding to BWP4.

It should be noted that the sub-frequency bands include, but are not limited to, individual frequency bands re-farmed for 5G. Each sub-frequency band in the aggregated frequency band is an independent frequency band before aggregation. The aggregated frequency band acquired after aggregation is treated as a new frequency band with a new frequency-band identifier, and the identifier for the existing frequency band is not used. That is, the identifier of the aggregated frequency band is a unique identifier, which is different from the existing identifier.

In addition, in related technologies, with regard to BWPs corresponding to different frequency bands, for example, BWPx corresponding to frequency band f1, and BWPy corresponding to frequency band f2, if the terminal needs to switch from frequency band f1 to frequency band f2, it needs to switch BWP. Since the sub-carrier spacings (SCSs) corresponding to different BWPs are different, it is necessary to deactivate BWPx first and then activate BWPy, which requires many steps, takes up more resources, and has a large delay.

According to some embodiments of the present disclosure, different sub-frequency bands belong to the same BWP, and different sub-frequency bands have the same SCS. In this case, when switching between frequency bands, the BWP can be kept active and the terminal only needs the indication of different sub-frequency bands for chaning the activated sub-frequency bands, without the need for deactivating BWPs or deactivating sub-frequency bands. For example, the currently activated sub-frequency band is f1. If the activation indication information indicates to activate f2, the terminal can directly switch from f1 to f2, without deactivating the BWP where f1 and f2 are located, or deactivating f1. This is beneficial to reduce the delay in switching between frequency bands and reduce resource consumption during the switching process.

FIG. 2 is a schematic diagram of BWP within an aggregated frequency band according to some embodiments of the present disclosure. As shown in FIG. 2, the bandwidth corresponding to the BWP includes at least one of the following:

a complete sub-frequency band, a partial bandwidth in a sub-frequency band, a plurality of complete sub-frequency bands and a gap among the plurality of complete sub-frequency bands, a partial bandwidth in a plurality of sub-frequency bands and a gap among the plurality of sub-frequency bands.

In some embodiments, as shown in FIG. 2, for example, the aggregated frequency band includes three sub-frequency bands f1, f2, and f3. The bandwidths of f1 and f3 are 30M, and the bandwidth of f2 is 40M. Then, the bandwidth of the aggregated frequency band is 100M. There is a gap between two adjacent bandwidths. For example, the bandwidths of the two gaps shown in FIG. 2 are equal, and both are 10M. The gap refers to the bandwidth that is unavailable (indicating the bandwidth that is unavailable for a certain communication system). For example, f1, f2 and f3 are re-farmed for the 5G system, but the gap is not re-farmed for the 5G system, so the gap is unavailable in the 5G system.

The terminal configured with 4 BWPs in the aggregated frequency band is taken as an example. For example, BWP1 may correspond to a partial bandwidth in sub-frequency band f1. BWP2 corresponds to the complete sub-frequency band f2. BWP3 corresponds to a partial bandwidth in the two sub-frequency bands f2 and f3 as well as the gap between f2 and f3. BWP4 corresponds to the three complete sub-frequency bands f1, f2, f3, as well as the two gaps among these three sub-frequency bands (in some possible implementations, there may be only one gap, that is, two sub-frequency bands are continuous and the gap exists between these two continuous sub-frequency bands and the third sub-frequency band).

It should be noted that the bandwidths corresponding to the above four BWPs are only used to relatively and comprehensively express their corresponding relationship with the sub-frequency bands. The specific situation about BWPs in the aggregated frequency band is not limited to the embodiment shown in FIG. 2, and may be set as needed.

When the activation indication information activates a certain sub-frequency band in the BWP, if the sub-frequency band is a complete sub-frequency band in the BWP, then the complete sub-frequency band is activated; or if the sub-frequency band is not a complete sub-frequency band in the BWP, then only part of the frequency band corresponding to the BWP in this sub-frequency band is activated.

FIG. 3 is a schematic diagram of a BWP within an aggregated frequency band according to another embodiment of the present disclosure. As shown in FIG. 3, the method also includes the following step(s).

In step S301, configuration information is sent to the terminal. The configuration information is used for indicating the timing advance (TA) and/or quasi-colocation (QCL) type corresponding to each sub-frequency band.

In some embodiments, when the sub-frequency band includes an individual frequency band re-farmed for 5G, since this part of individual frequency band is around 1 GHz and is a relatively low-frequency band, the base station can use different antennas for receiving and sending signals in different frequency bands, which may result in differences in the TA and the QCL type of each sub-frequency band.

Therefore, the base station can configure the TA corresponding to each sub-frequency band by sending the configuration to the terminal, and can also configure the QCL type corresponding to each sub-frequency band, so that the terminal can communicate well with the base station based on the TA and the QCL corresponding to the sub-frequency band.

For example, the terminal determines that the TA corresponding to sub-frequency band f1 is TA1 and the TA corresponding to sub-frequency band f2 is TA2 based on the configuration information. Then, the terminal may send uplink signals based on TA1 when it communicates with the base station on f1, and may send uplink signals based on TA2 when it communicates with the base station on f2.

In some embodiments, the activation indication information and/or the configuration information are carried in downlink control information (DCI).

The DCI may also carry the activation indication information. That is, the base station may send activation indication information to the terminal through DCI, so as to activate one or more sub-frequency bands corresponding to the BWP. Also, DCI may carry TA and QCL corresponding to the sub-frequency band that needs to be activated, so that the activation operation and the configuration operation of TA and QCL can be completed through a sending process of DCI, which is beneficial to save communication resources.

In some embodiments, each sub-frequency band in the aggregated frequency band corresponds to a timing advance and/or a quasi-colocation type respectively, or the aggregated frequency band corresponds to a timing advance and/or a quasi-colocation type.

The base station may set the entire aggregated frequency band to correspond to one TA, or set the entire aggregated frequency band to correspond to one QCL type. The base station may also set each sub-frequency band in the aggregated frequency band to correspond to a respective TA. For example, different sub-frequency bands correspond to different TAs. Alternatively, the base station may set each sub-frequency band to correspond to a respective QCL type. For example, different sub-frequency bands correspond to different QCL types.

In some embodiments, each sub-frequency band in the aggregated frequency band corresponds to a timing advance and/or a quasi-colocation type, and the timing advance and/or the quasi-colocation type are associated with the identifier of the sub-frequency band.

When each sub-frequency band in the aggregated frequency band corresponds to a TA and/or a QCL type respectively, an identifier, such as a number, may be set for each sub-frequency band in the aggregated frequency band, and the association relationship between the TA/QCL type and the identifier of each sub-frequency band may be established, for example in the form of table. The terminal and the base station may store the association relationship in advance.

It should be noted that one sub-frequency band may correspond to one TA and/or one QCL type, or it may correspond to multiple TAs and/or multiple QCL types.

When corresponding to one TA and/or one QCL type, the base station does not need to send configuration information to the terminal for configuring the TA and/or the QCL type. When the terminal determines the activated sub-frequency band based on the activation indication information, it may automatically query the TA and/or the QCL type corresponding to the activated sub-frequency band according to the association relationship.

When corresponding to multiple TAs and/or multiple QCL types, an identifier may be set for each TA and/or each QCL type, for example, a T/Q identifier for short. Then, when configuring the TA and/or the QCL type for the sub-frequency band, the T/Q identifier corresponding to the TA and/or the QCL type as selected may be sent to the terminal. The terminal may pre-store the corresponding relationship between the T/Q identifier and the TA and/or the QCL type, and then query the specific TA and/or QCL type corresponding to the received T/Q identifier.

In some embodiments, the method further includes the following step(s).

Sleep indication information is sent to the terminal for indicating at least one sub-frequency band in the activated sub-frequency bands to sleep quickly.

The base station may also indicate at least one sub-frequency band in the activated sub-frequency bands to sleep quickly through the sleep indication information. For example, when multiple sub-frequency bands are activated and the base station determines that the communication bandwidth can be reduced based on the service requirements, it may indicate one or more sub-frequency bands in these multiple sub-frequency bands to sleep quickly. In this case, the base station and the terminal may temporarily stop using the sleeping sub-frequency band. For example, the base station stops transmitting downlink signals on the sleeping sub-frequency band, and the terminal stops receiving downlink signals on the sleeping sub-frequency band, so that the bandwidth that needs maintenance by the base station and the terminal is reduced, which helps to save resources.

FIG. 4 is a schematic flow chart of a frequency band activation method according to some embodiments of the present disclosure. The frequency band activation method shown in this embodiment may be performed by a terminal. The terminal includes, but is not limited to, mobile phone, tablet computer, wearable device, sensor, Internet of Things device, and other communication device. The terminal may serve as user equipment to communicate with a base station, and the base station includes, but is not limited to, base stations in communication systems, such as 4G base station, 5G base station, and 6G base station.

As shown in FIG. 4, the frequency band activation method may include the following step(s).

In step S401, the activation indication information sent by the base station is received. The terminal is configured with at least one bandwidth part BWP operating in an aggregated frequency band. The aggregated frequency band has a new frequency-band identifier and includes a plurality of sub-frequency bands. At least two adjacent sub-frequency bands among the plurality of sub-frequency bands are discontinuous. The bandwidth corresponding to the BWP includes at least one sub-frequency band in the aggregated frequency band.

In step S402, one BWP in the at least one configured BWP and at least one sub-frequency band in the activated BWP are activated according to the activation indication information.

In some embodiments, there may be some individual frequency bands on the communication frequency band. These frequency bands are not continuous, and the bandwidth of each frequency band is small. For example, there are some individual frequency bands around 1 GHz that are re-farmed for the 5G system, and the bandwidths of these frequency bands are around 30M. It is difficult for using these frequency bands separately to meet the requirements in certain service scenarios for 5G communications. For example, in the case of eMBB services, the required bandwidth must reach 100M.

In some embodiments, the base station may determine a plurality of sub-frequency bands, and at least two adjacent sub-frequency bands among the plurality of sub-frequency bands are discontinuous. For example, two adjacent sub-frequency bands among the plurality of sub-frequency bands are discontinuous. As an example, each of the plurality of sub-frequency bands is discontinuous. As another example, some sub-frequency bands are continuous, and some sub-frequency bands are discontinuous. Furthermore, the base station may indicate the plurality of sub-frequency bands as an aggregated frequency band to the terminal, so that the bandwidth of the plurality of sub-frequency bands as the aggregated frequency band can meet the requirements for most services, thereby rendering the sub-frequency bands to be effectively utilized when the sub-frequency bands have smaller bandwidths and are discontinuous with other sub-frequency bands. In all embodiments of the present disclosure, the expression of two adjacent sub-frequency bands being discontinuous means that there is a gap between the two adjacent sub-frequency bands. That is, the two adjacent sub-frequency bands are discontinuous in frequency.

In some embodiments, the base station may send configuration information to the terminal for configuring at least one BWP operating in the aggregated frequency band and the bandwidth corresponding to each BWP for the terminal.

The terminal may determine at least one BWP in the aggregated frequency band according to the configuration information, and determine the bandwidth corresponding to each BWP. In another embodiment, the UE may determine the BWP, that is, the bandwidth corresponding to the BWP, according to the relevant communication standards. The base station may determine the BWP, that is, the bandwidth corresponding to the BWP, according to the relevant communication standards. For example, a preset determination method (such as a calculation formula) is provided in the protocol for determining the bandwidth corresponding to BWP. In another embodiment, the UE may negotiate with the base station to determine the bandwidth corresponding to the BWP. That is, the bandwidth corresponding to each BWP may be configured based on the base station, may be determined based on the protocol, or may be determined through negotiation between the base station and the UE. In the above embodiment, with respect to the at least one configured BWP, activation indication information may also be sent to the terminal to activate one of the BWPs.

According to embodiments of the present disclosure, the bandwidth corresponding to the BWP includes at least one sub-frequency band in the aggregated frequency band, and at least one sub-frequency band corresponding to the activated BWP may not all in operation. In this case, not only the BWP can be activated through the activation indication information, but also at least one sub-frequency band in the BWP sub-frequency band can be activated. Accordingly, the accuracy in activating frequency domain resources can be improved, which is beneficial to meet the communication requirements between the base station and the terminal.

For example, the terminal is configured with four BWPs operating in the aggregated frequency band, namely BWP1, BWP2, BWP3, and BWP4. The aggregated frequency band includes three discontinuous sub-frequency bands f1, f2, and f3. The BWP that needs to be activated is BWP4. BWP4 corresponds to sub-frequency bands f1, f2, and f3. With the activation indication information, BWP4 can be activated, and one or more sub-frequency bands in BWP4 can also be activated. For example, f1 corresponding to BWP4 is activated. Thus, the terminal can communicate with the base station on the activated sub-frequency band in the activated BWP, for example, communicate with the base station on f1 corresponding to BWP4.

It should be noted that the sub-frequency bands include, but are not limited to, individual frequency bands re-farmed for 5G. Each sub-frequency band in the aggregated frequency band is an individual frequency band before aggregation. The aggregated frequency band acquired after aggregation is treated as a new frequency band with a new frequency-band identifier, and the identifier of the existing frequency band is not used. That is, the identifier of the aggregated frequency band is a unique identifier, which is different from the existing identifier.

In addition, in related technologies, with regard to BWPs corresponding to different frequency bands, for example, BWPx corresponding to frequency band f1, and BWPy corresponding to frequency band f2, if the terminal needs to switch from frequency band f1 to frequency band f2, it needs to switch BWP. Since the sub-carrier spacings SCSs corresponding to different BWPs are different, it is necessary to deactivate BWPx first and then activate BWPy, which requires many steps, takes up more resources, and has a large delay.

According to embodiments of the present disclosure, different sub-frequency bands belong to the same BWP, and different sub-frequency bands have the same SCS. When switching between frequency bands, the BWP can be kept active and the terminal only needs the indication of different sub-frequency bands for changing the activated sub-frequency bands, without deactivating BWPs or deactivating sub-frequency bands. For example, the currently activated sub-frequency band is f1. If the activation indication information indicates to activate f2, the terminal can directly switch from f1 to f2, without deactivating the BWP where f1 and f2 are located, or deactivating f1. It is beneficial to reduce the delay in switching between frequency bands and reduce resource consumption during the switching process.

In some embodiments, the bandwidth corresponding to the BWP includes at least one of the following:
a complete sub-frequency band, a partial bandwidth in a sub-frequency band, a plurality of complete sub-frequency bands and a gap among the plurality of complete sub-frequency bands, a partial bandwidth in a plurality of sub-frequency bands and a gap among the plurality of sub-frequency bands.

In some embodiments, as shown in FIG. 2, for example, the aggregated frequency band includes three sub-frequency bands f1, f2, and f3. The bandwidths of f1 and f3 are 30M, and the bandwidth of f2 is 40M. Then, the bandwidth of the aggregated frequency band is 100M. There is a gap between two adjacent bandwidths. For example, the bandwidths of the two gaps shown in FIG. 2 are equal, and both are 10M. The gap refers to the bandwidth that is unavailable (indicating the bandwidth that is unavailable for a certain communication system). For example, f1, f2, and f3 are re-farmed for the 5G system, but the gap is not re-farmed for the 5G system, so the gap is unavailable in the 5G system.

The terminal configured with 4 BWPs in the aggregated frequency band is taken as an example. For example, BWP1 may correspond to part of the bandwidth in sub-frequency band f1. BWP2 corresponds to the complete sub-frequency band f2. BWP3 corresponds to a partial bandwidth in the two sub-frequency bands f2 and f3, as well as the gap between f2 and f3. BWP4 corresponds to the three complete sub-frequency bands f1, f2, f3, as well as the two gaps among these three sub-frequency bands (in some possible implementations, there may be only one gap, that is, two sub-frequency bands are continuous and the gap exists between the two continuous sub-frequency bands and the third sub-frequency band).

It should be noted that the bandwidths corresponding to the above four BWPs are only used to relatively and comprehensively express the corresponding relationship with respect to the sub-frequency bands. The specific situation about BWPs in the aggregated frequency band is not limited to the embodiment shown in FIG. 2, and may be set as needed.

When the activation indication information activates a certain sub-frequency band in the BWP, if the sub-frequency band is a complete sub-frequency band in the BWP, then the complete sub-frequency band is activated; or if the sub-frequency band is not a complete sub-frequency band in the BWP, then only part of the frequency band corresponding to the BWP in this sub-frequency band is activated.

FIG. 5 is a schematic flow chart of a frequency band activation method according to another embodiment of the present disclosure. As shown in FIG. 5, the method also includes the following step(s).

In step S501, the configuration information sent by the base station is received.

In step S502, the timing advance and/or the quasi-colocation type corresponding to each sub-frequency band is determined according to the configuration information.

In some embodiments, when the sub-frequency band includes an individual frequency band re-farmed for 5G, since this part of individual frequency band is around 1 GHz and is a relatively low-frequency band, the base station can use different antennas for receiving and sending signals in different frequency bands, which may result in differences in the TA and the QCL type of each sub-frequency band.

Therefore, the base station can configure the TA corresponding to each sub-frequency band by sending the configuration to the terminal, and can also configure the QCL type corresponding to each sub-frequency band, so that the terminal can communicate well with the base station based on the TA and the QCL corresponding to the sub-frequency band.

For example, according to the configuration information, the terminal determines that the TA corresponding to sub-frequency band f1 is TA1 and the TA corresponding to sub-frequency band f2 is TA2. Then, when the terminal communicates with the base station on f1, it can send uplink signals based on TA1. When the terminal communicates with the base station on f2, it can send uplink signals based on TA2.

In some embodiments, the activation indication information and/or the configuration information are carried in downlink control information DCI.

The DCI may also carry the activation indication information. That is, the base station may send the activation indication information to the terminal through DCI, so as to activate one or more sub-frequency bands corresponding to the BWP. DCI may also carry TA and QCL corresponding to the sub-frequency band that needs to be activated. Thus, the activation operation and the configuration operation of TA and QCL can be completed through a sending process of DCI, which is beneficial to save communication resources.

In some embodiments, each sub-frequency band in the aggregated frequency band corresponds to a timing advance and/or a quasi-colocation type respectively, or the aggregated frequency band corresponds to a timing advance and/or a quasi-colocation type.

The base station may set the entire aggregated frequency band to correspond to one TA, or set the entire aggregated frequency band to correspond to one QCL type. The base station may also set each sub-frequency band in the aggregated frequency band to correspond to a respective TA. For example, different sub-frequency bands correspond to different TAs. Alternatively, the base station may set each sub-frequency band to correspond to a respective QCL type. For example, different sub-frequency bands correspond to different QCL types.

In some embodiments, each sub-frequency band in the aggregated frequency band corresponds to a timing advance and/or a quasi-colocation type, and the timing advance and/or the quasi-colocation type are associated with the identifier of the sub-frequency band.

When each sub-frequency band in the aggregated frequency band corresponds to a TA and/or a QCL type respectively, an identifier, such as a number, may be set for each sub-frequency band in the aggregated frequency band, and the association relationship between the TA/QCL type and the identifier of each sub-frequency band may be established, for example in the form of table. The terminal and the base station may store the association relationship in advance.

It should be noted that one sub-frequency band may correspond to one TA and/or one QCL type, or correspond to multiple TAs and/or multiple QCL types.

When corresponding to one TA and/or one QCL type, the base station does not need to send configuration information to the terminal for configuring the TA and/or the QCL type. When the terminal determines the activated sub-frequency band based on the activation indication information, it may automatically query the TA and/or the QCL type corresponding to the activated sub-frequency band according to the association relationship.

When corresponding to multiple TAs and/or multiple QCL types, an identifier may be set for each TA and/or each QCL type, for example, a T/Q identifier for short. Then, when configuring the TA and/or the QCL type for the sub-frequency band, the T/Q identifier corresponding to the TA and the QCL identifier as selected may be sent to the terminal. The terminal may pre-store the corresponding relationship between the T/Q identifier and the TA and/or the QCL type, and then query the specific TA and/or QCL type according to the received T/Q identifier.

In some embodiments, the method further includes: receiving sleep indication information sent by the base station; and causing at least one sub-frequency band in the activated sub-frequency bands to sleep quickly.

The base station may also indicate at least one sub-frequency band in the activated sub-frequency bands to sleep quickly through the sleep indication information. For example, when multiple sub-frequency bands are activated and the base station determines that the communication bandwidth can be reduced based on the service requirements, it may indicate one or more sub-frequency bands in these multiple sub-frequency bands to sleep quickly. In this case, the base station and the terminal can temporarily stop using the sleeping sub-frequency band. For example, the base station stops transmitting downlink signals on the sleeping sub-frequency band, and the terminal stops receiving downlink signals on the sleeping sub-frequency band, so that the bandwidth that needs maintenance by the base station and the terminal is reduced, which helps to save resources.

Corresponding to the aforementioned embodiments of the activation indication method and the frequency band activation method, the present disclosure also provides embodiments of an activation indication apparatus and a frequency band activation apparatus.

Embodiments of the present disclosure also propose an activation indication apparatus, which is suitable for a base station, including, but not limited to, base stations in communication systems such as 4G base station, 5G base station, and 6G base station. The base station may communicate with terminals that are user equipments, including, but not limited to, mobile phone, tablet computer, wearable device, sensor, Internet of Things device, and other communication device.

In some embodiments, the apparatus includes one or more processors. The processor is configured to send activation indication information to the terminal. The terminal is configured with at least one bandwidth part BWP operating in an aggregated frequency band. The aggregated frequency band has a new frequency-band identifier and includes a plurality of sub-frequency bands. At least two adjacent sub-frequency bands among the plurality of sub-frequency bands are discontinuous. The bandwidth corresponding to the BWP includes at least one sub-frequency band in the aggregated frequency band.

The activation indication information is used to activate one BWP among the at least one configured BWP and at least one sub-frequency band among the sub-frequency bands corresponding to the activated BWP.

In some embodiments, the bandwidth corresponding to the BWP includes at least one of the following:

a complete sub-frequency band, a partial bandwidth in a sub-frequency band, a plurality of complete sub-frequency bands and a gap among the plurality of complete sub-frequency bands, a partial bandwidth in a plurality of sub-frequency bands and a gap among the plurality of sub-frequency bands.

In some embodiments, the processor is further configured to send configuration information to the terminal. The configuration information is used to indicate the timing advance and/or the quasi-colocation type corresponding to each of the sub-frequency bands.

In some embodiments, the activation indication information and/or the configuration information are carried in downlink control information DCI.

In some embodiments, each sub-frequency band in the aggregated frequency band corresponds to a timing advance and/or a quasi-colocation type respectively, or the aggregated frequency band corresponds to a timing advance and/or a quasi-colocation type.

In some embodiments, each sub-frequency band in the aggregated frequency band corresponds to a timing advance and/or a quasi-colocation type, and the timing advance and/or the quasi-colocation type are associated with the identifier of the sub-frequency band.

In some embodiments, the processor is further configured to send sleep indication information to the terminal for indicating at least one sub-frequency band in the activated sub-frequency bands to sleep quickly.

Embodiments of the present disclosure also provide a frequency band activation apparatus, which may be applied to a terminal, including but not limited to mobile phone, tablet computer, wearable device, sensor, Internet of Things device, and other communication device. The terminal may serve as user equipment to communicate with a base station, and the base station includes, but is not limited to, base stations in communication systems such as 4G base station, 5G base station, and 6G base station.

In some embodiments, the apparatus includes one or more processors. The processor is configured to receive activation indication information sent by the base station. The terminal is configured with at least one bandwidth part BWP operating in the aggregated frequency band. The aggregated frequency band has a new frequency-band identifier and includes a plurality of sub-frequency bands. At least two adjacent sub-frequency bands among the plurality of sub-frequency bands are discontinuous. The bandwidth corresponding to the BWP includes at least one sub-frequency band in the aggregated frequency band.

The processor is further configured to activate one BWP in the at least one configured BWP and at least one sub-frequency band in the activated BWP according to the activation indication information.

In some embodiments, the bandwidth corresponding to the BWP includes at least one of the following:

a complete sub-frequency band, a partial bandwidth in a sub-frequency band, a plurality of complete sub-frequency bands and a gap among the plurality of complete sub-frequency bands, a partial bandwidth in a plurality of sub-frequency bands and a gap among the plurality of sub-frequency bands.

In some embodiments, the processor is further configured to: receive configuration information sent by the base station; and determine the timing advance and/or the quasi-colocation type corresponding to each of the sub-frequency bands according to the configuration information.

In some embodiments, the activation indication information and/or the configuration information are carried in downlink control information DCI.

In some embodiments, each sub-frequency band in the aggregated frequency band corresponds to a timing advance and/or a quasi-colocation type respectively, or the aggregated frequency band corresponds to a timing advance and/or a quasi-colocation type.

In some embodiments, each sub-frequency band in the aggregated frequency band corresponds to a timing advance and/or a quasi-colocation type, and the timing advance and/or the quasi-colocation type are associated with the identifier of the sub-frequency band.

In some embodiments, the processor is further configured to: receive sleep indication information sent by the base station; and cause at least one sub-frequency band in the activated sub-frequency bands to sleep quickly.

Regarding the apparatus in the above embodiments, the specific manner in which each module performs operations has been described in detail in the embodiments of the relevant methods, and will not be described in detail here.

As for the apparatus embodiments, since they basically correspond to the method embodiments, reference may be made to the partial description of the method embodiments for relevant details. The apparatus embodiments described above are only illustrative. The modules described as separate components may or may not be physically separated. The components shown as modules may or may not be physical modules. That is, they may be located in one place, or distributed over multiple network modules. Some or all of the modules may be selected according to actual needs to achieve the purpose of the solution in some embodiments of the present disclosure. Persons of ordinary skill in the art can understand and implement the method without any creative effort.

Some embodiments of the present disclosure also proposes a communication apparatus, including: a processor; and a memory for storing a computer program. The computer program is configured to, when executed by the processor, cause the activation indication method described in any of the above embodiments to be implemented.

Some embodiments of the present disclosure also proposes a communication apparatus, including: a processor; and a memory for storing a computer program. The computer program is configured to, when executed by the processor, cause the frequency band activation method described in any of the above embodiments to be implemented.

Some embodiments of the present disclosure also proposes a non-transitory computer-readable storage medium for storing a computer program. When the computer program is executed by a processor, the steps in the activation indication method described in any of the above embodiments are implemented.

Some embodiments of the present disclosure also proposes a non-transitory computer-readable storage medium for storing a computer program. When the computer program is executed by a processor, the steps in the frequency band activation method described in any of the above embodiments are implemented.

As shown in FIG. 6, FIG. 6 is a schematic block diagram of an activation indication apparatus 600 according to some embodiments of the present disclosure. The apparatus 600 may be provided as a base station. With reference to FIG. 6, the apparatus 600 includes a processing component 622, a wireless transmit/receive component 624, an antenna component 626, and a signal processing portion specific to the wireless interface. The processing component 622 may further include one or more processors. One of the processors in the processing component 622 may be configured to implement the activation indication method described in any of the above embodiments.

FIG. 7 is a schematic block diagram of a frequency band activation apparatus 700 according to some embodiments of the present disclosure. For example, the apparatus 700 may be a mobile phone, a computer, a digital broadcast terminal, a messaging device, a game console, a tablet device, a medical device, a fitness device, a personal digital assistant, or the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls the overall operations of the apparatus 700, such as operations associated with display, phone call, data communication, camera operation, and recording operation. The processing component 702 may include one or more processors 720 to execute instructions for completing all or part of the steps of the above-mentioned frequency band activation method. Additionally, the processing component 702 may include one or more modules that facilitate interactions between the processing component 702 and other components. For example, the processing component 702 may include a multimedia module to facilitate interactions between the multimedia component 708 and the processing component 702.

The memory 704 is configured to store various types of data to support operations at the apparatus 700. Examples of such data include instructions for any application or method operating on the apparatus 700, contact data, phonebook data, messages, pictures, videos, etc. The memory 704 may be implemented by any type of volatile or non-volatile storage device, or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk.

The power component 706 provides power to the various components of the apparatus 700. The power component 706 may include a power management system, one or more power supplies, and other components associated with generating, managing, and distributing power for the apparatus 700.

The multimedia component 708 includes a screen that provides an output interface between the apparatus 700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundary of a touch or slide operation, but also detect the duration and the pressure associated with the touch or slide operation. In some embodiments, the multimedia component 708 includes a front camera and/or a rear camera. When the apparatus 700 is in an operation mode, such as a shooting mode or a video mode, the front camera and/or the rear camera may receive external multimedia data. Each of the front camera and the rear camera may be a fixed optical lens system or has a focal length and optical zooming capabilities.

The audio component 710 is configured to output and/or input audio signals. For example, the audio component 710 includes a microphone (MIC), configured to receive external audio signals when the apparatus 700 is in the operation mode, such as call mode, recording mode, and speech recognition mode. The received audio signal may be further stored in the memory 704 or sent via the communication component 716. In some embodiments, the audio component 710 also includes a speaker for outputting audio signals.

The I/O interface 712 provides an interface between the processing component 702 and the peripheral interface module. The peripheral interface module may be a keyboard, a click wheel, a button, etc. The button may include, but is not limited to, Home button, Volume button, Start button, and Lock button.

The sensor component 714 includes one or more sensors for providing various aspects of status assessment for the apparatus 700. For example, the sensor component 714 may detect the on or off state of the apparatus 700, the relative positioning among components, such as display and keypad of the apparatus 700. The sensor component 714 may also detect a change in position of the apparatus 700 or a component of the apparatus 700, the presence or absence of the user contact with the apparatus 700, orientation or acceleration/deceleration of the apparatus 700, and temperature change of the apparatus 700. The sensor component 714 may include a proximity sensor, configured to detect the presence of nearby objects without any physical contact. The sensor component 714 may also include a light sensor, such as a CMOS or CCD image sensor, for use in imaging applications. In some embodiments, the sensor component 714 may also include an acceleration sensor, a gyroscope sensor, a magnetic sensor, a pressure sensor, or a temperature sensor.

The communication component 716 is configured to facilitate the wired or wireless communication between the apparatus 700 and other devices. The apparatus 700 may access a wireless network based on a communication standard, such as WiFi, 2G or 3G, 4G LTE, 5G NR, or a combination thereof. In one embodiment, the communication component 716 receives broadcast signals or broadcast related information from an external broadcast management system via a broadcast channel. In one embodiment, the communication component 716 also includes a near field communication (NFC) module to facilitate short-range communications. For example, the NFC module may be implemented based on radio frequency identification (RFID) technology, infrared data association (IrDA) technology, ultra-wideband (UWB) technology, Bluetooth (BT) technology, and other technologies.

In some embodiments, the apparatus 700 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above frequency band activation method.

In some embodiments, there is also provided a non-transitory computer-readable storage medium including instructions, such as a memory 704 including instructions. The above instructions may be executed by the processor 720 of the apparatus 700 to complete the above frequency band activation method. For example, the non-transitory computer-readable storage medium may be ROM, random access memory (RAM), CD-ROM, magnetic tape, floppy disk, optical data storage device, etc.

Other embodiments of the present disclosure will be readily apparent to those skilled in the art from consideration of the specification and practice of the contents disclosed herein. The present disclosure is intended to cover any variations, uses, or adaptations of the present disclosure that follow the general principle of the present disclosure and include common sense or customary technical means in the technical field that are not disclosed in the present disclosure. It is intended that the specification and examples be considered as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

It should be noted that in the description, relational terms such as first and second are only used to distinguish one entity or operation from another entity or operation, and do not necessarily require or imply that any such actual relationship or sequence exits between these entities or operations. The terms "comprise," "include," or any other variation thereof are intended to cover a non-exclusive inclusion, such that a process, method, article, or device including a list of elements includes not only those elements but also others not expressly listed elements, or elements inherent to such process, method, article, or device. Without further limitation, an element defined by the statement "comprises a . . . " does not exclude the presence of additional identical elements in a process, method, article, or device that includes the stated element.

The methods and apparatuses provided by the embodiments of the present disclosure are introduced in detail above. Specific examples are used in the description to illustrate the principle and implementations of the present disclosure. The description of the above embodiments is only used to help understanding the methods and their core ideas of the present disclosure. At the same time, for those of ordinary skill in the art, there will be changes in the specific implementation and application scopes based on the ideas of the present disclosure. In summary, the content of this specification should not be understood as any limitation to the present disclosure.

What is claimed is:

1. An activation indication method, performed by a base station, and comprising: sending activation indication information to a terminal, wherein the terminal is configured with at least one bandwidth part (BWP) operating in an aggregated frequency band, the aggregated frequency band comprises a new frequency-band identifier and a plurality of sub-frequency bands, at least two adjacent sub-frequency bands among the plurality of sub-frequency bands are discontinuous, and a bandwidth corresponding to the BWP comprises at least one sub-frequency band in the aggregated frequency band, wherein the activation indication information is configured for activating one BWP among the at least one BWP and at least one sub-frequency band among sub-frequency bands corresponding to the activated BWP.

2. The method according to claim 1, wherein the bandwidth corresponding to the BWP comprises at least one of: a complete sub-frequency band, a partial bandwidth in a sub-frequency band, a plurality of complete sub-frequency bands and a gap among the plurality of complete sub-frequency bands, a partial bandwidth in a plurality of sub-frequency bands and a gap among the plurality of sub-frequency bands.

3. The method according to claim 1, further comprising: sending configuration information to the terminal, wherein the configuration information is configured for indicating at least one of a timing advance and a quasi-colocation type corresponding to at least one sub-frequency band.

4. The method according to claim 3, wherein at least one of the activation indication information and the configuration information are carried in downlink control information DCI.

5. The method according to claim 3, wherein at least one sub-frequency band in the aggregated frequency band corresponds to at least one of a timing advance and a quasi-colocation type; or the aggregated frequency band corresponds to at least one of a timing advance and a quasi-colocation type.

6. The method according to claim 5, wherein at least one sub-frequency band in the aggregated frequency band corresponds to at least one of a timing advance and a quasi-colocation type, and at least one of the timing advance and the quasi-colocation type are associated with an identifier of the sub-frequency band.

7. The method according to claim 1, wherein the method further comprises: sending sleep indication information to the terminal, wherein the sleep indication information is configured for indicating at least one sub-frequency band in the activated sub-frequency bands to sleep quickly.

8. A frequency band activation method, performed by a terminal, and comprising: receiving activation indication information sent by a base station, wherein the terminal is configured with at least one bandwidth part (BWP) operating in an aggregated frequency band, the aggregated frequency band comprises a new frequency-band identifier and a plurality of sub-frequency bands, at least two adjacent sub-frequency bands among the plurality of sub-frequency bands are discontinuous, and a bandwidth corresponding to the BWP comprises at least one sub-frequency band in the aggregated frequency band; and activating one BWP among the at least one BWP and at least one sub-frequency band in the activated BWP according to the activation indication information.

9. The method according to claim 8, wherein the bandwidth corresponding to the BWP comprises at least one of: a complete sub-frequency band, a partial bandwidth in a sub-frequency band, a plurality of complete sub-frequency bands and a gap among the plurality of complete sub-frequency bands, a partial bandwidth in a plurality of sub-frequency bands and a gap among the plurality of sub-frequency bands.

10. The method according to claim 8, further comprising: receiving configuration information sent by the base station; and determining at least one of a timing advance and a quasi-colocation type corresponding to at least one sub-frequency band according to the configuration information.

11. The method according to claim 10, wherein at least one of the activation indication information and the configuration information are carried in downlink control information DCI.

12. The method according to claim 10, wherein at least one sub-frequency band in the aggregated frequency band corresponds to at least one of a timing advance and a quasi-colocation type; or the aggregated frequency band corresponds to at least one of a timing advance and a quasi-colocation type.

13. The method according to claim 12, wherein at least one sub-frequency band in the aggregated frequency band corresponds to at least one of a timing advance and a quasi-colocation type, and at least one of the timing advance and the quasi-colocation type are associated with an identifier of the sub-frequency band.

14. The method according to claim 8, wherein the method further comprises: receiving sleep indication information sent by the base station; and causing at least one sub-frequency band in the activated sub-frequency bands to sleep quickly.

15. A communication apparatus, comprising: a processor; and a memory, used for storing a computer program, wherein the processor is configured to perform acts comprising: sending activation indication information to a terminal, wherein the terminal is configured with at least one bandwidth part BWP operating in an aggregated frequency band, the aggregated frequency band comprises a new frequency-band identifier and a plurality of sub-frequency bands, at least two adjacent sub-frequency bands among the plurality of sub-frequency bands are discontinuous, and a bandwidth corresponding to the BWP comprises at least one sub-frequency band in the aggregated frequency band, wherein the activation indication information is configured for activating one BWP among the at least one BWP and at least one sub-frequency band among sub-frequency bands corresponding to the activated BWP.

16. A communication apparatus, comprising: a processor; and a memory, used for storing a computer program, wherein the computer program is configured to, when executed by the processor, cause the frequency band activation method according to claim 8 to be implemented.

17. The communication apparatus according to claim 15, wherein the bandwidth corresponding to the BWP comprises at least one of: a complete sub-frequency band, a partial bandwidth in a sub-frequency band, a plurality of complete sub-frequency bands and a gap among the plurality of complete sub-frequency bands, a partial bandwidth in a plurality of sub-frequency bands and a gap among the plurality of sub-frequency bands.

18. The communication apparatus according to claim 15, wherein the processor is further configured to perform: sending configuration information to the terminal, wherein the configuration information is configured for indicating at least one of a timing advance and a quasi-colocation type corresponding to at least one sub-frequency band.

19. The communication apparatus according to claim 18, wherein at least one of the activation indication information and the configuration information are carried in downlink control information DCI.

20. The communication apparatus according to claim 15, wherein the processor is further configured to perform: sending sleep indication information to the terminal, wherein the sleep indication information is configured for indicating at least one sub-frequency band in the activated sub-frequency bands to sleep quickly.

* * * * *